United States Patent
Riddick et al.

(10) Patent No.: US 11,906,478 B2
(45) Date of Patent: Feb. 20, 2024

(54) SYSTEM, METHOD, AND APPARATUS FOR AUTOMATING SPECIMEN TESTING

(71) Applicant: Illinois Tool Works Inc., Glenview, IL (US)

(72) Inventors: Adrian Riddick, Norwood, MA (US); Daniel Chouinard, Norwood, MA (US); Brian Salem, Norwood, MA (US); Christopher Hines, Norwood, MA (US)

(73) Assignee: Illinois Tool Works Inc., Glenview, IL (US)

( * ) Notice: Subject to any disclaimer, the term of this patent is extended or adjusted under 35 U.S.C. 154(b) by 83 days.

(21) Appl. No.: 17/578,729

(22) Filed: Jan. 19, 2022

(65) Prior Publication Data

US 2022/0228957 A1 Jul. 21, 2022

Related U.S. Application Data

(60) Provisional application No. 63/140,046, filed on Jan. 21, 2021.

(51) Int. Cl.
*G01N 3/08* (2006.01)
*G01L 5/00* (2006.01)

(52) U.S. Cl.
CPC .............. *G01N 3/08* (2013.01); *G01L 5/0038* (2013.01)

(58) Field of Classification Search
CPC ........ G01N 3/08; G01L 5/0038; G01L 5/0047
See application file for complete search history.

(56) References Cited

U.S. PATENT DOCUMENTS

| | | | |
|---|---|---|---|
| 3,397,572 A * | 8/1968 | Stolz | G01N 3/08 73/822 |
| 4,315,427 A | 2/1982 | Leiter | |
| 4,337,644 A * | 7/1982 | Leiter | G01L 5/0038 73/52 |
| 5,178,017 A * | 1/1993 | Dinzburg | G01N 3/20 73/849 |

(Continued)

FOREIGN PATENT DOCUMENTS

| | | | |
|---|---|---|---|
| JP | S51115980 | * | 9/1976 |
| JP | S51115980 U | | 9/1976 |

(Continued)

OTHER PUBLICATIONS

International Search Report and Written Opinion, dated Jun. 28, 2022, in International application No. PCT/US2022/013263, filed on Jan. 21, 2022 (20 pages).

(Continued)

*Primary Examiner* — Octavia Davis Hollington
(74) *Attorney, Agent, or Firm* — McAndrews, Held & Malloy, Ltd.

(57) ABSTRACT

Described is a test head for a residual seal force (RSF) testing system. The test head includes a housing, an anvil, and a ball roller assembly. The housing defines a first cavity and the anvil is positioned at least partially within the first cavity. The ball roller assembly is configured to provide a point of contact between the housing and the anvil during a RSF test. The test head may further comprise a retaining ring configured to maintain the anvil at least partially within the first cavity.

26 Claims, 9 Drawing Sheets

(56) References Cited

U.S. PATENT DOCUMENTS

| | | | | |
|---|---|---|---|---|
| 5,739,411 | A | * | 4/1998 | Lee .......................... G01N 3/48 73/12.09 |
| 5,983,731 | A | * | 11/1999 | Sommerfeld ............. G01L 1/02 73/862 |
| 9,645,064 | B1 | * | 5/2017 | Alam ........................ G01N 3/30 |
| 11,599,205 | B2 | * | 3/2023 | Riddick ................ G06F 3/0338 |
| 2022/0228933 | A1 | * | 7/2022 | Riddick ................ G01L 1/2243 |
| 2022/0229079 | A1 | * | 7/2022 | Riddick ........... G01N 35/00029 |

FOREIGN PATENT DOCUMENTS

| | | | |
|---|---|---|---|
| JP | S57130248 | * | 8/1982 |
| JP | S57130248 U | | 8/1982 |
| RU | 2233437 C2 | * | 7/2004 |

OTHER PUBLICATIONS

PCT, International Preliminary Report on Patentability regarding Application No. PCT/US2022/013263, dated Jul. 20, 2023, 11 pages.

* cited by examiner

SYSTEM, METHOD, AND APPARATUS FOR AUTOMATING SPECIMEN TESTING

CROSS REFERENCE TO RELATED APPLICATIONS

The present application claims the benefit of, and priority to, U.S. Provisional Patent Application No. 63/140,046, entitled "System, Method, And Apparatus For Automating Specimen Testing," filed Jan. 21, 2021, the entire contents of which are hereby incorporated by reference.

FIELD

The present disclosure is directed to specimen testing and, more particularly, to a system, method, and apparatus for automating residual seal force testing and/or compression friction measurement testing.

BACKGROUND

Since the early part of the $20^{th}$ century, containers (e.g., bottles, vials, etc.) with elastomeric closures and, in some cases, crimped caps have been a primary packaging system for parenteral (i.e., injectable) medicines. Parenteral products contained in such container package systems require a robust seal at the interface between the glass container and the elastomeric stopper to prevent contamination and product leakage. While the seal is established in the manufacturing process, it must withstand a variety of handling, processing, and storage conditions prior to use.

In some examples, container seal is composed of three major components—the glass container, an elastomeric closure (e.g., a rubber stopper), and a cap that secures the rubber stopper in the container, such as an aluminum cap. When a metal cap is used, typically an aluminum or aluminum alloy, the cap must be crimped onto the stopped container with a compressive force that will ensure sufficient mating of the container and elastomeric closure. In other examples, the cap is removed for other testing. Closure variables that affect the container seals include dimensional characteristics and tolerances, along with the mechanical properties of the closure components, including modulus, hardness, and compression set.

Manufacturers of parenteral containers are required to employ a quantitative method for measuring the force a closure exerts against the container after the initial seal is made and throughout the shelf life of the product. In the case of a closure that uses a metal cap, this force measured using a residual seal force ("RSF") test, while a compression friction ("CF") measurement test is used evaluate a glass container that is sealed using a plunger. A CF measurement test is sometimes called a glide test. While existing RSF and CF testers can measure the RSF and CF, such testing can be time consuming, tedious, and labor intensive. Therefore, it is desirable to provide a more accurate, more tolerant, and/or automated system, method, and apparatus for RSF and/or CF testing.

SUMMARY

Systems, methods, and apparatuses for testing are disclosed, substantially as illustrated by and described in connection with at least one of the figures. More particularly, systems, methods, and apparatuses are disclosed for determining the residual seal force and/or compression friction measurement for containers, particularly containers for parenteral pharmaceutical products.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 4b illustrates a plan cross-sectional views of the third example test head taken along section A-A of FIG. 4a.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "circuit" and "circuitry" includes any analog and/or digital components, power and/or control elements, such as a microprocessor, digital signal processor (DSP), software, and the like, discrete and/or integrated components, or portions and/or combinations thereof.

As used herein, the terms "compression rod" and "compression pin" as used herein, each mean a rigid structure configured to impart a compressive force upon a specimen positioned in a testing system. In the case of a CF test, for example, the compression pin can be used to compress the elastomeric closure within a rigidly-supported parenteral container, such as a vial.

As used herein, the terms "drivingly coupled," "drivingly coupled to," and "drivingly coupled with" as used herein, each mean a mechanical connection that enables a driving part, device, apparatus, or component to transfer a mechanical force to a driven part, device, apparatus, or component.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

As used herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

A quantitative method for measuring a closure force exerted against a container after sealing can be performed using a constant rate of compression testing machine. By exerting a slow, constant rate of compression on a sealed container, a stress vs. time curve can be generated to determine a residual seal force (RSF) measurement of a given closure seal in a specimen. The RSF measurement can be determined for a variety of containers with various closure sizes and shapes. RSF measurements, for example, can be used to indicate the security of the container's closure as part of a manufacturer's quality control. The initial force with which the closure compresses the container is a function of the vertical and horizontal crimping forces applied during application (e.g., crimping) of the aluminum cap; however, due to the viscoelastic relaxation behavior of rubber, the force of the closure pressing against the containers decays as a function of time, elastomer composition, and as a result of various processing procedures. In another example, a compression friction (CF) measurement test can be performed using the compression testing machine to qualify a glass container that is sealed using an elastomeric closure (e.g., a plunger). A CF measurement test is sometimes referred to as a glide test.

To evaluate a seal tightness, manufacturers sometimes use manual testing systems as part of their quality control processes to measure the RSF or the CF of a parenteral package created during a container-sealing process. Typically, manufacturers test small batches or volumes (e.g., lot or line samples) as part of its quality control efforts. Because RSF and CF testing is considered destructive testing (i.e., the product is no longer saleable), manufacturers may test only between 0.5% and 1.25% of the production, or about 0.66% of the production. Further, operators, who are already busy with other production-related tasks, are only permitted a limited amount of time to perform each test (e.g., about 1-2 minutes per specimen). Automating the RSF and the CF testing processes, however, can increase the testing speed and the volume of product that can be tested. To automate RSF and CF testing, precautions must be taken to ensure that the specimen are properly loaded to the testing system to ensure accurate measurements.

Figure 1A:
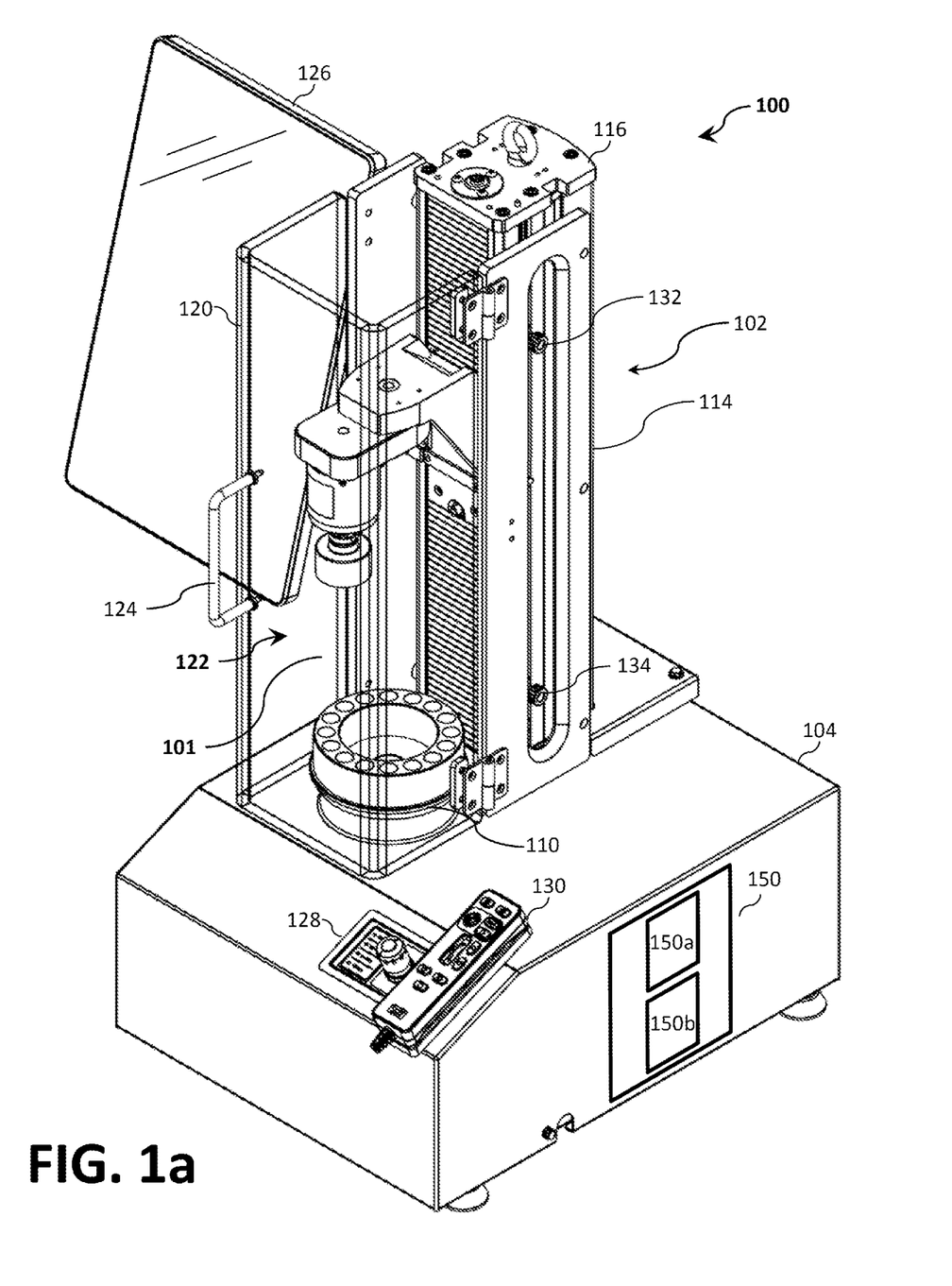
FIG. 1a illustrates a perspective view of an example testing system in accordance with aspects of this disclosure.
Figure 1B:
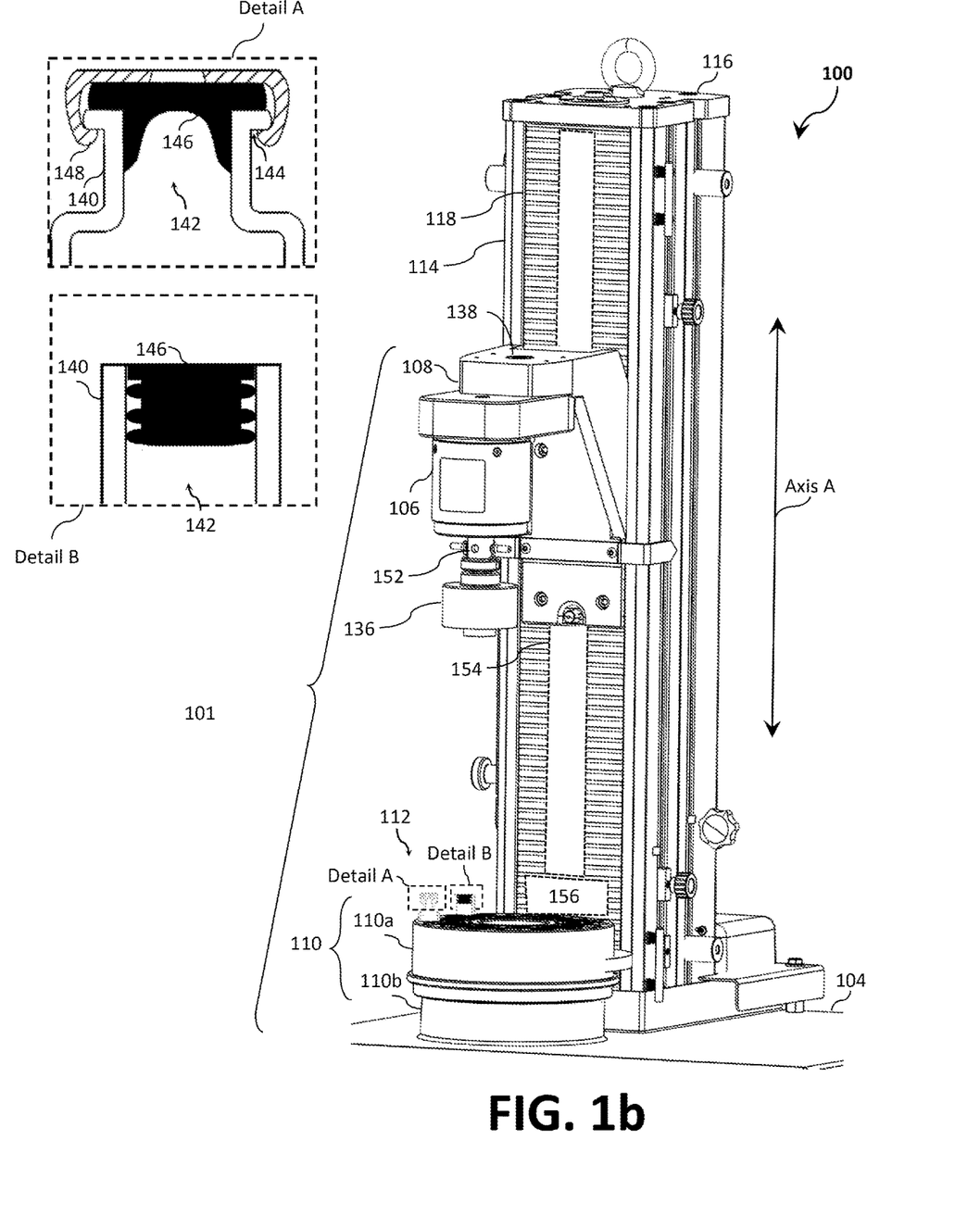
FIG. 1b illustrates a perspective view of the example testing system of FIG. 1a with portions removed to better illustrate the load string.

FIG. 1a illustrates perspective view of an example testing system 100, while FIG. 1b illustrates a perspective view of the load frame 102 of the example testing system 100 with portions omitted for clarity. The testing system 100 generally comprises a load frame 102, a load cell 106 mounted to a crosshead 108 of the load frame 102, a platen assembly 110 at a base structure 104 of the load frame 102, and a controller 150. As will be discussed, the platen assembly 110 is configured to support one or more specimens 112 during compression testing (e.g., RSF or CF testing), whether through a manual or automated process.

As best illustrated in FIG. 1a, the load frame 102 comprises a base structure 104, one or more columns 114, a moving crosshead 108, and a top plate 116. The load frame 102 serves as a high stiffness support structure against which the test forces react (e.g., compressive forces) during a test (e.g., a RSF test, compression friction measurement test, etc.). While the load frame 102 may be composed of a single column 114, as illustrated, multiple columns 114 may be employed, for example, in a dual column arrangement. The base structure 104 generally serves to support the one or more columns 114 and a platen assembly 110 that supports the specimen 112, while also housing various circuitry and components, such as a controller 150.

The platen assembly 110 may be manually or automatically adjusted (or otherwise controlled) to move or transfer a specimen 112 to a testing position, which is typically aligned below the test head 136, test apparatus, or other test accessory. The specimen 112 may be, for example, a container 140 for a parenteral pharmaceutical product as illustrated in FIG. 1b. As best illustrated in Detail A of FIG. 1b, in one example, the container 140 (e.g., a bottle with a flange 144) defines an opening 142 and a flange 144. An elastomeric closure 146 covers the opening 142. A cap 148 is crimped under flange 144 and compresses the elastomeric closure 146 to seal the opening 142. In another example, as best illustrated in Detail B of FIG. 1b, the cap 148 may be omitted whereby the elastomeric closure 146 fits within the opening 142 of the container 140 (e.g., a vial) and presses against the inner surface of the container 140 to seal the opening 142. While the specimen 112 is illustrated as a container 140 with and without a flange 144 and/or cap 148, other types of specimens 112 are also contemplated.

Each of the one or more columns 114 comprises a guide column and a ballscrew 154 that is drivingly coupled to an actuator 156. A ball screw 154 is a form of mechanical linear actuator that translates rotational motion (e.g., from an actuator 156, such as a motor) to linear motion with little friction. In one example, the ballscrew 154 may include a threaded shaft that provides a helical raceway for ball bearings, which acts as a precision screw. As illustrated in FIG. 1b, the ballscrew 154 is housed within the one or more columns 114 between the base structure 104 and the top plate 116. The actuator 156 that drives the ballscrew 154 is controlled via the controller 150. A column cover 118 may be provided to protect the ballscrew 154 from dirt, grime, and damage, while also protecting the user from harm during operation. The testing system 100 comprises various sensors to monitor its operation. For example, the testing system 100 may include an upper limit switch 132 and a lower limit switch 134 to prevent the crosshead 108 from deviating from an acceptable range of motion along axis A. Upon triggering the upper limit switch 132 or the lower limit switch 134, the controller 150 may stop (or reverse) the actuator 156 to prevent damage to the testing system 100 or the specimen 112.

The crosshead 108 is mounted to both the guide column and the ballscrew 154 and supports the load cell 106. The ballscrew 154 is driven (e.g., rotated) via an actuator 156. Rotation of the ballscrew 154 drives the crosshead 108 up (away) or down (toward) relative to the base structure 104, while the guide column provides stability to the crosshead 108. The load cell 106 may be removably coupled to the crosshead 108 via one or more mechanical fasteners 138 (e.g., screws, bolts, socket head cap screws, etc.) to enable the operator to exchange the load cell 106 when desired. For example, the load cell 106 may become damaged, a different type of load cell 106 may be desired or needed, which can vary by test (e.g., RSF and CF testing).

The display device 126 (e.g., a touch screen display), control panel 128, and/or remote control 130 (e.g., a handset) may be used by the operator to monitor and/or control operation of the testing system 100. In some example, the control panel 128 and the remote control 130 may each provide one or more switches, buttons, or dials to control or adjust operation of the testing system 100 (e.g., an emergency stop button). The control panel 128 and the remote control 130 may further provide one or more status indicators (e.g., LEDs, lights, etc.) to provide a status of the testing system 100. The remote control 130 may be wired or wireless.

To provide additional protection and increase safety, the load string 101 may be housed in an enclosure 120 that defines a test chamber 122. The enclosure 120 may be fabricated from a transparent material (e.g., glass, plastic, Plexiglas, etc.) to enable the operator to observe the load string 101. A door or access panel 124 may be provided to enable access to the test chamber 122 within the enclosure 120. The load string 101 generally refers to the components installed between the moving crosshead 108 and the base structure 104 (or, where applicable, a fixed lower crosshead). Typically, the load string 101 includes the load cell 106, the test head 136, any adapters required to connect the components, and the specimen(s) 112 to be tested. Typically, for RSF testing, the load cell 106 is mounted on the crosshead 108, a test head 136 with an anvil is mounted to the load cell 106, and a specimen 112 is positioned on the base structure 104 (e.g., using a platen assembly 110). Similarly, for CF testing, a load cell 106 is mounted on the crosshead 108, a compression rod is mounted to the load cell 106, and a specimen 112 is positioned on the base structure 104 (e.g., using a platen assembly 110).

Operation of the testing system 100 may be automatically controlled and/or monitored via the controller 150. The controller 150 may comprise a processor 150a and memory device 150b configured with executable instructions. The controller 150 is operably coupled to, and configured to control, the various actuators (e.g., the actuator 156 that drives the ballscrew 154), sensors (e.g., load cell(s) 106, upper and lower limit switches 132, 134), user interfaces (e.g., display device 126, control panel 128, and/or remote control 130), etc.

During the RSF test, for example, the crosshead 108 moves down along Axis A of the load frame 102 (toward the base structure 104) to apply compressive load to the specimen 112 via a test head 136, test apparatus, or other test accessory that is coupled to the load cell 106. The test head 136 may be, or include, an anvil (also known as a dorn) configured to contact and compress the one or more specimens 112. The test head 136, test apparatus, or other test accessory may be coupled directly to a coupler 152 of the load cell 106 or via a compression rod or pin.

The load cell 106 converts this load into an electrical signal that the testing system 100 measures via controller 150 and displays to the operator via display device 126. In one example, the test head 136 may advance at a constant speed (e.g., about 0.01 inches/second). In other words, in this example, for every 0.001 inches the crosshead 108 travels along the column 114 (along Axis A), the controller 150 automatically records the force exerted by the specimen 112 in response to the movement (strain) imposed upon the specimen 112 by the test head 136. The constant speed may be adjusted for a given specimen 112. The controller 150 also automatically records the corresponding strain data. The resulting data set comprises a sequence of stress-strain measurements that can be graphed, which approximates a curve of predictable shape. In the case of RSF, an adequate seal may be determined by monitoring for an inflection point on resulting curve (e.g., indicating the elastomeric closure 146 has transitioned from flexing to rigid, thus sealing the opening 142).

The test head 136 may be designed for RSF and/or CF testing. For example, the test head 136 may be a compression rod for CF testing or include an anvil for RSF testing, such as a test head with an adjustable, conforming anvil. As can be appreciated, certain tests may warrant a specific type of test head 136. For example, the test head 136 used during RSF measurement may include an anvil that is sized and shaped to correspond to the size and shape of the closure of a parenteral container. Therefore, while the test head 136 is generally illustrated in FIGS. 1*a* and 1*b* as being configured for RSF testing, a compression rod (and associated load cell) may instead be used for CF testing.

The test head 136 can be interchangeable to enable the testing system 100 to be used for various types of tests (e.g., RSF, CF, tensile, compression, flexure, etc.). In other words, the test head 136 may be configured to removably couple with the load cell 106 via, for example, a coupler 152 or other means to enable the operator to replace or interchange the test head 136 with another test head 136, test apparatus, or other test accessory. The coupler 152 may employ one or more of a collar coupling (e.g., a collar with one or more set pins or screws), clevis coupling, sleeve coupling, or a screw on coupling (e.g., a threaded rod). Therefore, while the coupler 152 is illustrated as a female collar coupler with set screws and/or set pins, other types of couplings are contemplated.

The one or more specimens 112 are supported on the base structure 104 by the platen assembly 110. Akin to the test head 136, certain tests may warrant a specific type of platen assembly 110. For example, the platen assembly 110 used during RSF measurement may include one or more stations that are sized and shaped to correspond to the size and shape of the parenteral container 140 (or other specimen 112). That that end, the platen assembly 110 may comprise an specimen plate 110*a* that is test specific or specimen specific, and a base plate 110*b* supported by the base structure 104 and configured to support the specimen plate 110*a*. The specimen plate 110*a* may be removably coupled to the base plate 110*b* to enable the operator to select a specimen plate 110*a* that is suitable for a particular test. In one example, the specimen plate 110*a* is a plate or table that is sized and shaped to support the one or more specimens 112 (e.g., via one or more recesses), while the base plate 110*b* may be a plate configured to support and/or secure the specimen plate 110*a* relative to the base structure 104. In some examples, the specimen plate 110*a* is configured to move relative to the base plate 110*b*. For example, the specimen plate 110*a* may be configured to rotate or tilt relative to the base plate 110*b* to accommodate an approach angle of the test head 136 during compression.

To yield accurate RSF measurements, it is important that the test head 136 firmly contact the specimen 112 (e.g., the cap 148) during a RSF test. This typically requires that the operator check to ensure that the specimen 112 is properly seated in the platen assembly 110 such that the flat surface of the cap 148 is flush with the contact point of the test head 136 (e.g., the anvil). In an automated approach, this introduces additional complications.

One option is to employ a sensor system (e.g., one or more imaging devices) to confirm a correct placement of the specimen 112, however, sensor systems increase cost and complexity of the overall system testing system 100. A lower cost, but robust, option is use a test head 136 with an anvil that conforms to the position of the specimen 112 by enabling both planar and radially motion of the anvil during the seating portion of the RSF compression test to ensure that the test head 136 firmly contacts the specimen 112 (e.g., at the cap 148).

Figure 2A:
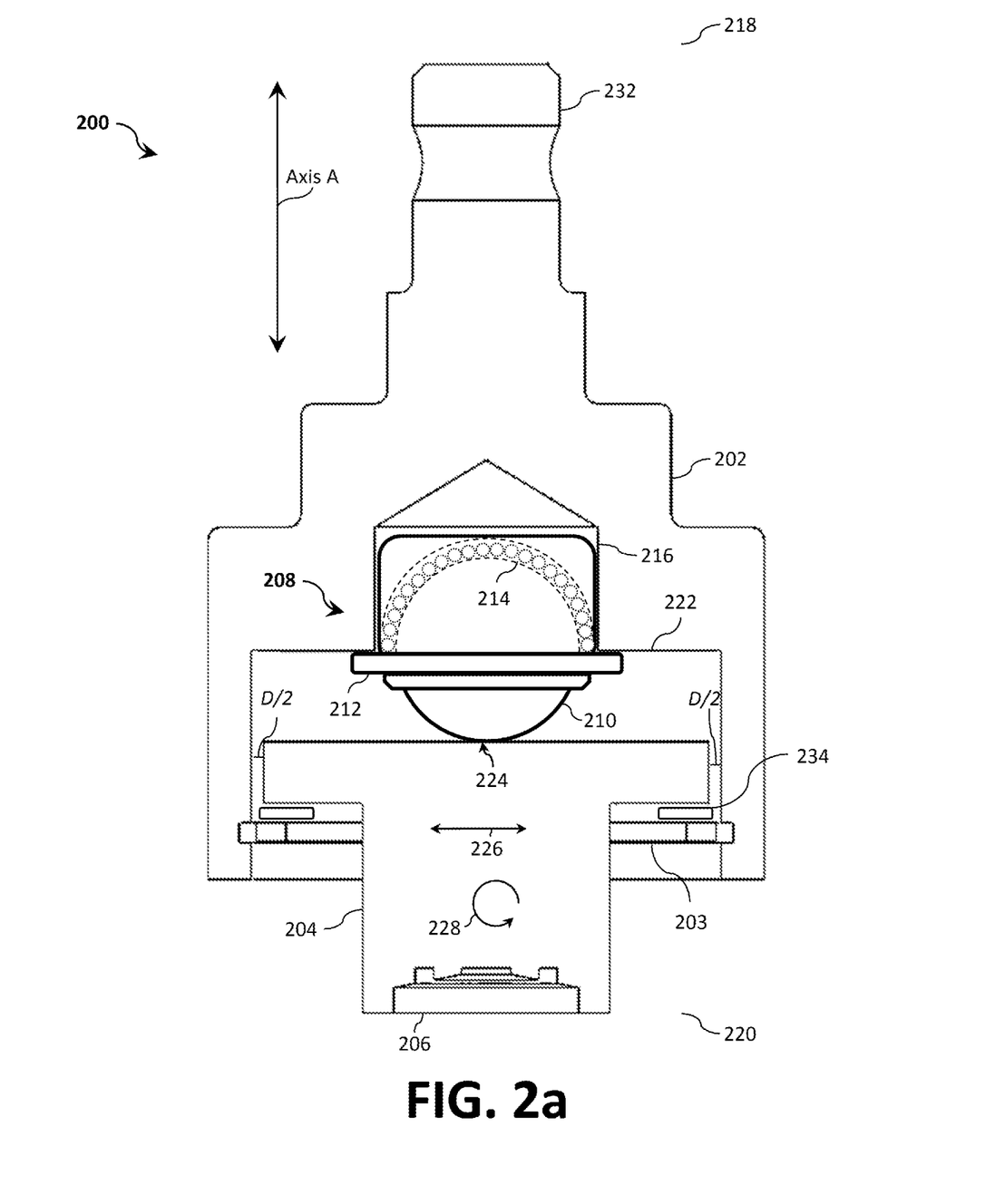
FIG. 2a illustrates a plan cross-sectional view of a first example test head in accordance with aspects of this disclosure.

FIG. 2*a* illustrates a plan cross-sectional view of a first example test head 200 in accordance with aspects of this disclosure. As illustrated, the test head 200 generally comprises a housing 202, an anvil 204, a ball roller assembly 208, and a retaining ring 203. The ball roller assembly 208 is configured to provide a point of contact 224 between the housing 202 and the anvil 204 during a RSF test. In some example, the retaining ring 203 is positioned within the first cavity 222 and configured to maintain the anvil 204 at least partially within the first cavity 222. During the RSF test, the compressive forces push the anvil 204 into the first cavity 222. The retaining ring 203 is configured to maintain the anvil 204 at least partially within the first cavity 222 in the absences of such compressive forces. The retaining ring 203 also provides a limit on the radially pivot 228 of the anvil 204 within the first cavity 222. The test head 200 defines a proximal end 218 having a first coupler 232 configured to engage with a second coupler 152 of the testing system 100 and a distal end 220 having a recess 206 configured to engage a specimen 112. The recess 206 may be sized and shaped to engage a surface of the cap 148 of the specimen 112. In some examples, an example of which is illustrated in FIG. 2*a*, a washer 234 can be positioned at the contact point between the anvil 204 and the retaining ring 203 to provide or adjust a limit on the radially pivot 228 of the anvil 204 within the first cavity 222. Though not illustrated, the washer 234 can be similarly configured in connection with the other views of the test head 200.

As illustrated, the anvil 204 is configured to float within the first cavity 222, thereby allowing a surface of the anvil 204 conform to the surface of the cap 148. In an automated process, for example, a plurality of specimens 112 may be preloaded and/or automatically fed to or by the platen assembly 110. Such movement can result in a specimen 112 being improperly seated (e.g., crooked). The accuracy of the RSF measurements decreases when the contact between the anvil 204 and the cap 148 is not flush. Therefore, to ensure that the cap 148 of the specimen 112 is properly seated in the recess 206 of the anvil 204, the anvil 204 is configured to move relative to the housing 202 in both a planar motion 226 (e.g., side-to-side) and to pivot radially 228 relative to the housing 202.

In some examples, the housing 202 defines a first cavity 222 and the anvil 204 is positioned at least partially within the first cavity 222. The outer diameter of the anvil 204 may be sized to allow for lateral movement in a plane of the anvil 204 within the first cavity 222. In other words, the inner diameter of the first cavity 222 may be larger than the outer diameter of the anvil 204 by a predetermined distance (D) to allow for some play within the first cavity 222. The predetermined distance (D) may be, for example, 1 to 10 millimeters. When the anvil 204 is centered in the first cavity 222, as illustrated in FIG. 2*b*, half of the distance (D/2) is available on each side of the anvil 204 for the planar motion 226.

The ball roller assembly 208 generally comprises a sphere 210, a roller housing 212, and a plurality of ball bearings 214. The ball roller assembly 208 may be rated to support 180N of compressive load. The plurality of ball bearings 214 serve to reduce friction between the sphere 210 and the roller housing 212. The ball roller assembly 208 may be positioned in a second cavity 216. For example, the ball roller assembly 208 can be press fit into the second cavity 216. In the illustrated example, the housing 202 defines a second cavity 216, however, as will be described in connection with FIGS. 3*a* through 3*c* where the anvil 204 may define the second cavity 216, other arrangements are contemplated. The housing 202, the anvil 204, and/or the sphere 210 may be fabricated from a metal or a metal alloy, such as stainless steel.

Figure 2B:
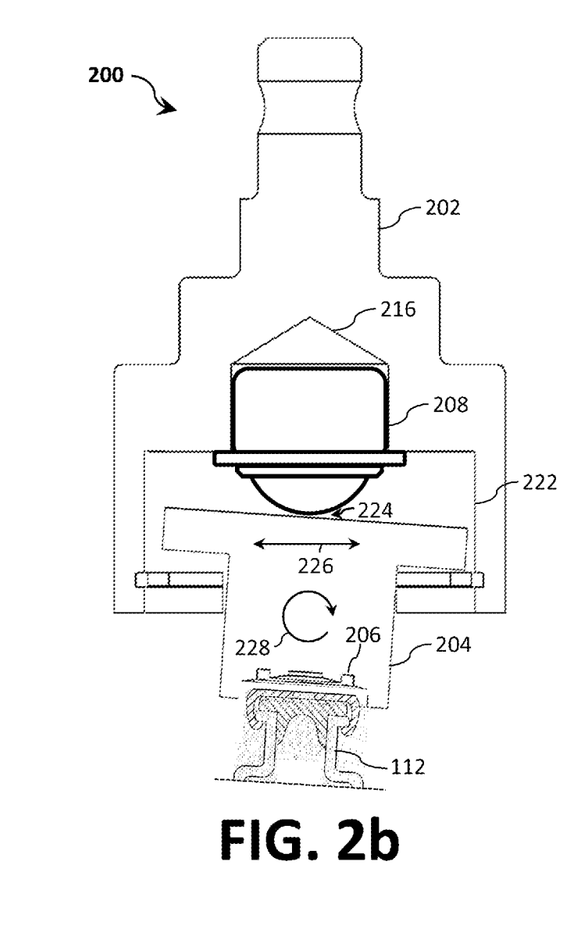
FIGS. 2b and 2c illustrate plan cross-sectional views of the first example test head of FIG. 2a in contact with a specimen.
Figure 2C:
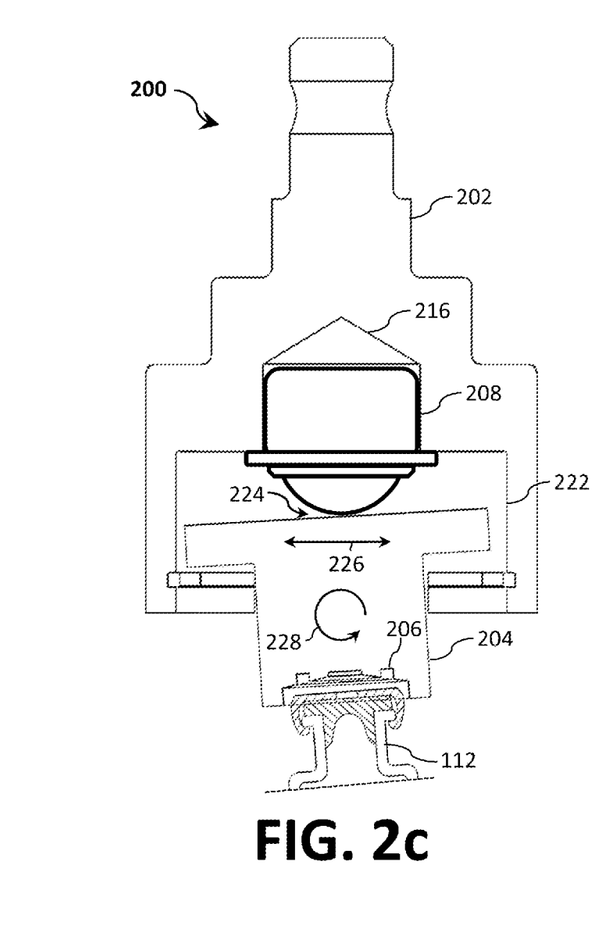

FIGS. 2*b* and 2*c* illustrate plan cross-sectional views of the first example test head of FIG. 2*a* in contact with a specimen 112 that is improperly seated at a first angle and a second angle, respectively. The ball roller assembly 208 provides a single point of contact 224 between the housing 202 and the anvil 204. As illustrated, the ball roller assembly 208 enables the anvil 204 to move in a planar motion 226 relative to the housing 202. During an RSF test, the anvil 204 can move in a planar motion 226 and/or 228 radial motion 228 such that the recess 206 of the anvil 204 is flush with the specimen 112.

Figure 2D:
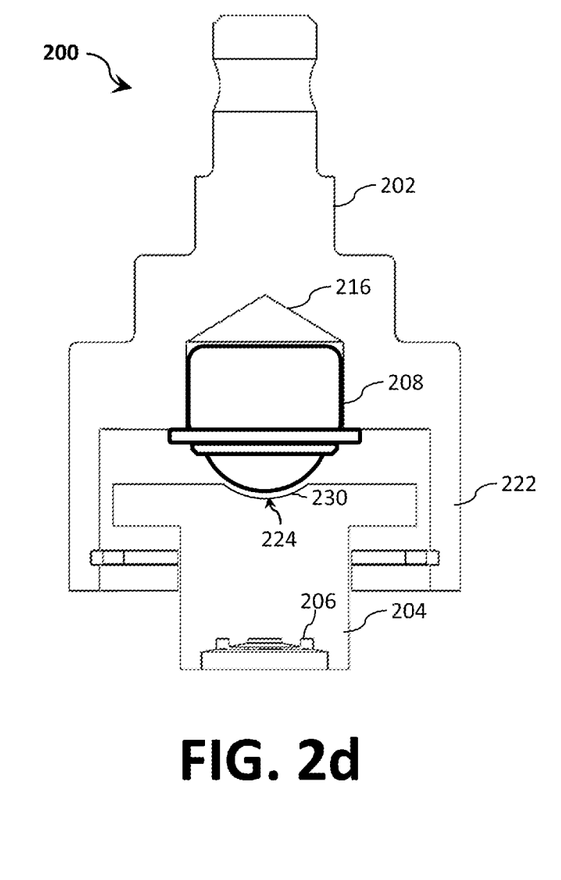
FIG. 2d illustrates a plan cross-sectional view of the first example test head with a concave region at the point of contact.

FIG. 2d illustrates a plan cross-sectional view of the first example test head with a concave region at the point of contact. Over time, the single point of contact 224 may create a wear point (e.g., a divot) on the anvil 204. As can be appreciated, a divot could prohibit the anvil 204 from freely floating, thereby reducing accuracy of the RSF measurements. To mitigate wear, the anvil 204 may define a concave region 230 at the single point of contact 224 that corresponds to the surface of the sphere 210, thereby increasing contact area with the ball roller assembly 208. The concave region 230 may alternatively be positioned on the housing 202 when the ball roller assembly 208 is secured to the anvil (e.g., as illustrated in FIG. 3a through 3c).

Figure 3A:
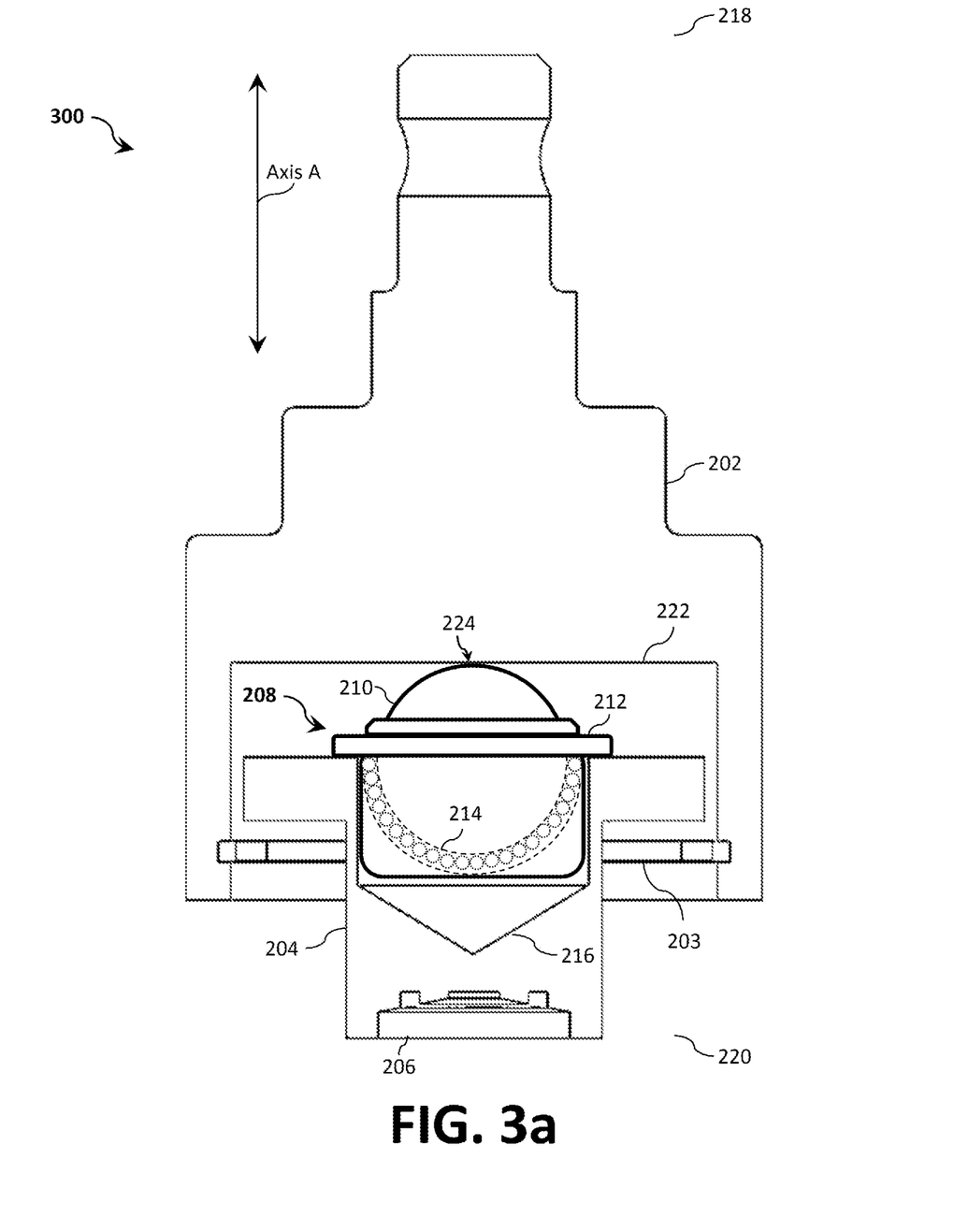
FIG. 3a illustrates a plan cross-sectional view of a second example test head in accordance with aspects of this disclosure.
Figure 3B:
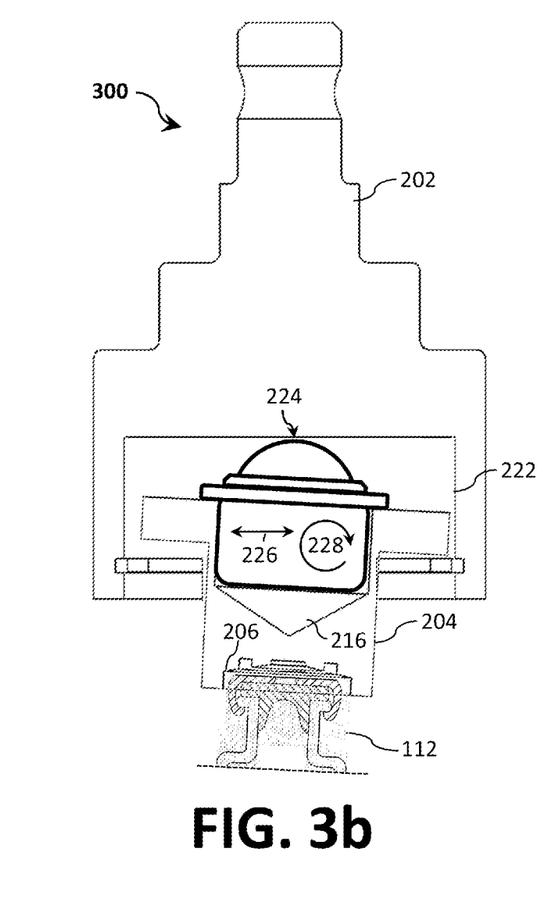
FIGS. 3b and 3c illustrate plan cross-sectional views of the second example test head of FIG. 3a in contact with a specimen.
Figure 3C:
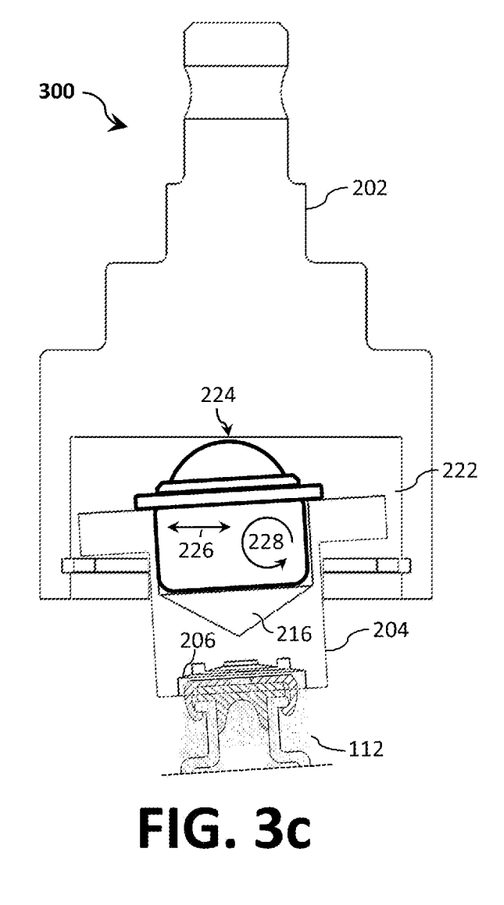

FIG. 3a illustrates a plan cross-sectional view of a second example test head 300 in accordance with aspects of this disclosure, while FIGS. 3b and 3c illustrate plan cross-sectional views of the second example test head 300 in contact with a specimen 112 that is improperly seated at a first angle and a second angle, respectively. The test head 300 of FIGS. 3a through 3c is substantially the same as the test head 200 of FIGS. 2a through 2c except that the anvil 204 defines the second cavity 216 for the ball roller assembly 208. In this example, the ball roller assembly 208 is press fit into the second cavity 216 of the anvil 204.

Figure 4A:
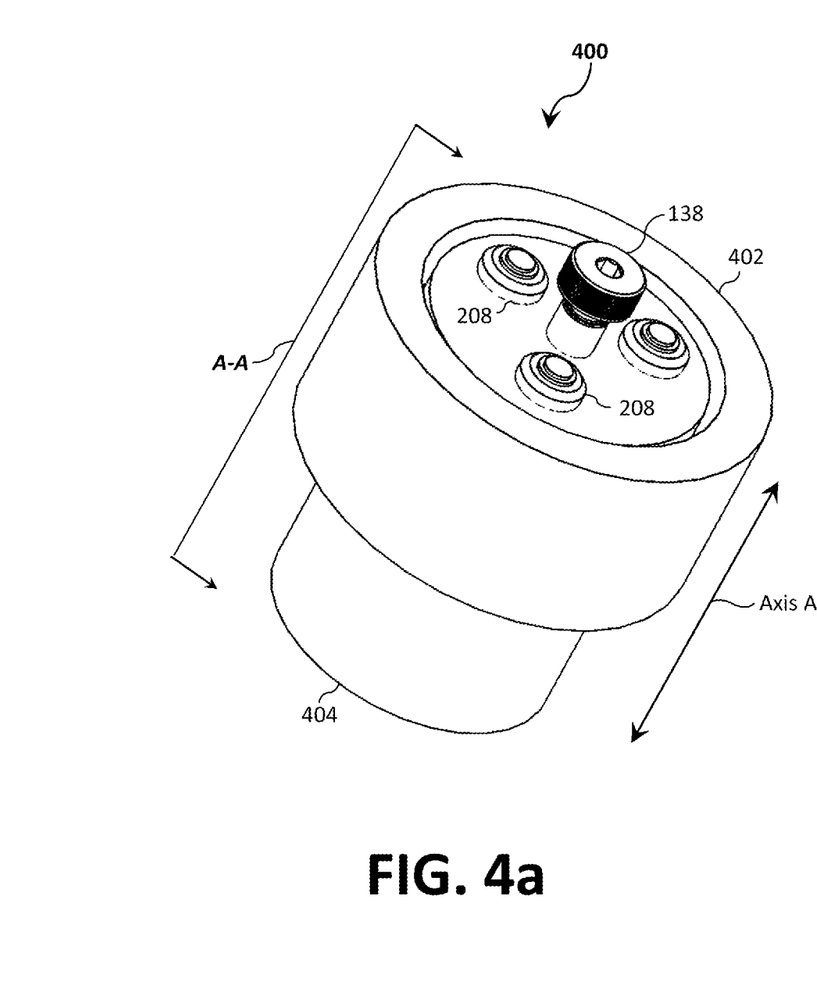
FIG. 4a illustrates a perspective view a third example test head in accordance with aspects of this disclosure.
Figure 4B:
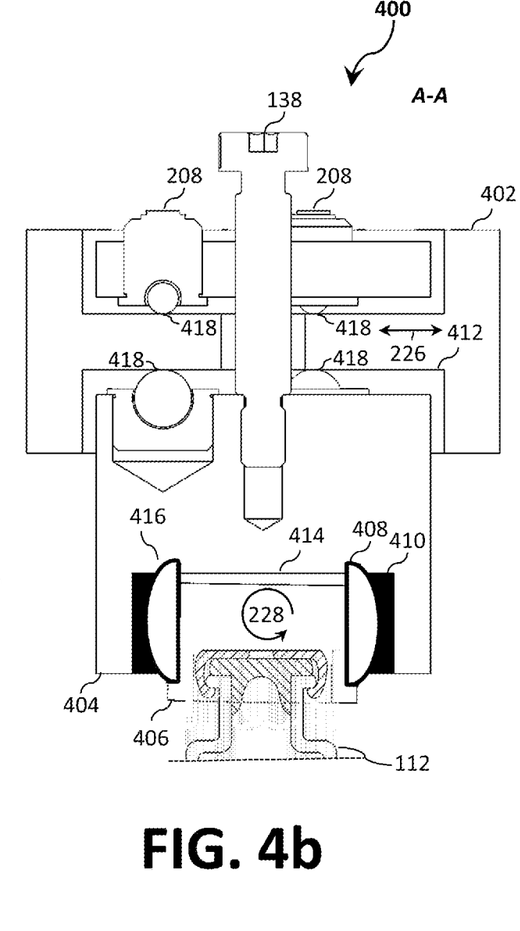

FIG. 4a illustrates a perspective view a third example test head 400 in accordance with aspects of this disclosure, while FIG. 4b illustrates a plan cross-sectional views of the third example test head taken along section A-A of FIG. 4a. The test head 400 of FIGS. 4a and 4b is similar to test heads 200, 300 in that it facilitates planar motion 226 and radial motion 228, however, test head 400 splits the planar motion 226 and radial motion 228 into two separate mechanisms. Specifically, planar motion 226 is provided via a plurality of ball bearing assemblies 418 and radial motion 228 is provided via a ball roller assembly 416.

The test head 400 generally comprises a first housing 402, a second housing 404, and an anvil 406. The first housing 402 defines a first cavity 412 and the second housing 404 defining a second cavity 414. The second housing 404 is positioned at least partially within the first cavity 412 and is configured to move in a planar motion 226 relative to the first housing 402. An anvil 406 positioned at least partially within the second cavity 414 and configured to pivot radially 228 relative to the second housing 404. As illustrated, the anvil 406 is configured to pivot radially 228 relative to the second housing 404 using a ball roller assembly 416. The ball roller assembly 416 comprises a sphere 408 and a roller housing 410.

A plurality of ball bearing assemblies 418 are provided to reduce friction between the surface of the first and second housings 402, 404. In some examples, as illustrated, the plurality of ball bearing assemblies 418 are press fit into cavities defined in the second housing 404, however, the plurality of ball bearing assemblies 418 may instead be press fit into cavities defined in the first housing 402. In some example, the ball roller assembly 416 may further comprises a plurality of ball bearings (not illustrated) between the sphere 408 and the roller housing 410.

Figure 5:
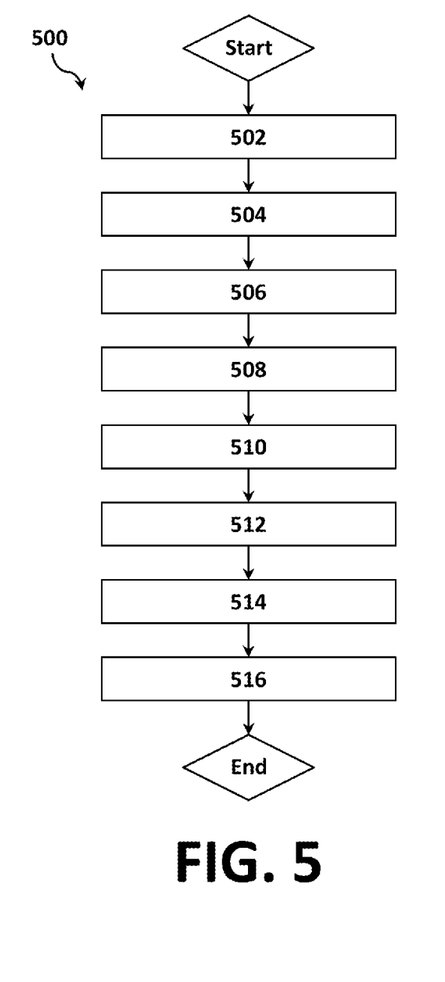
FIG. 5 is a flowchart representative of an example method for operating the example testing system.

FIG. 5 is a flowchart representative of an example method 500 for performing an automated residual seal force RSF test in a testing system 100. The testing system 100 comprises a load cell 106 configured to move along a column 114 toward and away from a base structure 104 via a crosshead 108.

At step 502, a plurality of specimens 112 are loaded to a specimen plate 110a. The plurality of specimens 112 are loaded to a specimen plate 110a may be loaded through a manual or automated process. The plurality of specimens 112 comprises a first specimen 112 and a subsequent specimen 112 (e.g., a second specimen 112).

At step 504, the specimen plate 110a is positioned in a first position that situates the first specimen 112 at a testing position of the testing system 100. The specimen plate 110a can be positioned in a first position manually (e.g., by the operator before the test is commenced) or via an actuator.

At step 506, the actuator 156 advances the crosshead 108 along the column 114 toward the base structure 104 to compress the first specimen 112.

At step 508, the processor 150a, which is operatively coupled to the load cell 106, determines a residual seal force of the first specimen 112.

At step 510, the actuator 156 retracts the crosshead 108 along the column 114 away the base structure 104.

At step 512, the specimen plate 110a is moved in a second position that situates the subsequent specimen 112 at the testing position.

At step 514, the actuator 156 advances the crosshead 108 along the column 114 toward the base structure 104 to compress the subsequent specimen 112.

At step 516, the processor 150a determines a residual seal force of the subsequent specimen 112.

Steps 512 through 516 may be automatically repeated for each subsequent specimen 112 until each of the plurality of specimens 112 loaded to the specimen plate 110a is tested.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A test head for a residual seal force (RSF) testing system, the test head comprising:
   a housing defining a first cavity;
   an anvil positioned at least partially within the first cavity;
   a ball roller assembly configured to provide a point of contact between the housing and the anvil during a RSF test, wherein the ball roller assembly comprises a plurality of ball bearings; and
   a retaining ring configured to maintain the anvil at least partially within the first cavity.

2. The test head of claim 1, wherein the anvil is configured to move in a planar motion relative to the housing.

3. The test head of claim 1, wherein the anvil is configured to pivot radially relative to the housing.

4. The test head of claim 1, wherein the anvil is configured to move relative to the housing in a planar motion and radially.

5. The test head of claim 1, wherein the anvil is configured to float within the first cavity.

6. The test head of claim 1, wherein the ball roller assembly comprises a sphere and a roller housing, wherein the plurality of ball bearings are configured to reduce friction between the sphere and the roller housing.

7. The test head of claim 6, wherein the sphere is fabricated from stainless steel.

8. The test head of claim 1, wherein the housing defines a second cavity.

9. The test head of claim 8, wherein the ball roller assembly is press fit into the second cavity.

10. The test head of claim 1, wherein the anvil defines a second cavity.

11. The test head of claim 10, wherein the ball roller assembly is press fit into the second cavity.

12. The test head of claim 1, wherein the retaining ring is positioned within the first cavity.

13. The test head of claim 1, wherein the anvil defines a recess configured to engage a specimen of the RSF testing system.

14. The test head of claim 1, wherein the housing defines a first coupler configured to engage with a second coupler of the testing system.

15. The test head of claim 1, wherein the test head defines a proximal end having a first coupler configured to engage with a second coupler of the testing system and a distal end having a recess configured to engage a specimen.

16. The test head of claim 15, wherein the first coupler is a clevis coupling or sleeve coupling.

17. The test head of claim 1, wherein the housing and the anvil are fabricated from a metal or a metal alloy.

18. The test head of claim 1, wherein the housing and the anvil are fabricated from stainless steel.

19. The test head of claim 1, wherein the ball roller assembly provides a single point of contact between the housing and the anvil.

20. The test head of claim 19, wherein the housing or the anvil defines a concave region at the single point of contact to increase contact with the ball roller assembly.

21. A test head for a residual seal force (RSF) testing system, the test head comprising:
 a first housing defining a first cavity;
 a second housing defining a second cavity, wherein the second housing is positioned at least partially within the first cavity and is configured to move in a planar motion relative to the first housing;
 an anvil positioned at least partially within the second cavity and configured to pivot radially relative to the second housing; and
 a ball roller assembly coupled to the anvil, wherein the anvil is configured to pivot radially relative to the second housing via the ball roller assembly.

22. The test head of claim 21, wherein the ball roller assembly comprises a sphere and a roller housing.

23. The test head of claim 22, wherein the ball roller assembly further comprises a plurality of ball bearings between the sphere and the roller housing.

24. The test head of claim 21, wherein the second housing is configured to move in a planar motion relative to the first housing using a plurality of ball bearings.

25. A testing system for performing a residual seal force (RSF) test, the testing system comprising:
 a column supported by a base structure;
 a load cell supported by said column, wherein the load cell is configured to move along the column toward and away from the base structure via a crosshead;
 a base plate supported by the base structure and configured to support a specimen; and
 a test head operably coupled to the load cell, wherein the test head comprises:
  a housing defining a first cavity;
  an anvil positioned at least partially within the first cavity;
  a ball roller assembly configured to provide a point of contact between the housing and the anvil during a RSF test, wherein the ball roller assembly comprises a plurality of ball bearings; and
  a retaining ring configured to maintain the anvil at least partially within the first cavity.

26. The testing system of claim 25, further comprising a specimen plate configured to receive the specimen, wherein the specimen plate is removably coupled to the base plate.

* * * * *